(12) United States Patent
Sugimoto

(10) Patent No.: US 12,540,927 B2
(45) Date of Patent: Feb. 3, 2026

(54) CHROMATOGRAPH MASS SPECTROMETRY DATA PROCESSING METHOD, CHROMATOGRAPH MASS SPECTROMETER, AND CHROMATOGRAPH MASS SPECTROMETRY DATA PROCESSING PROGRAM

(71) Applicant: SHIMADZU CORPORATION, Kyoto (JP)

(72) Inventor: Shinji Sugimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 618 days.

(21) Appl. No.: 17/927,237

(22) PCT Filed: May 25, 2020

(86) PCT No.: PCT/JP2020/020470
§ 371 (c)(1),
(2) Date: Nov. 22, 2022

(87) PCT Pub. No.: WO2021/240576
PCT Pub. Date: Dec. 2, 2021

(65) Prior Publication Data
US 2023/0213489 A1 Jul. 6, 2023

(51) Int. Cl.
*G01N 30/72* (2006.01)
*G01N 30/02* (2006.01)
*H01J 49/00* (2006.01)

(52) U.S. Cl.
CPC ...... *G01N 30/7206* (2013.01); *H01J 49/0036* (2013.01); *G01N 2030/025* (2013.01); *G01N 2030/027* (2013.01)

(58) Field of Classification Search
CPC ......... G01N 30/7206; G01N 2030/025; G01N 2030/027; G01N 30/72; G01N 27/62; G01N 30/8651; H01J 49/0036
(Continued)

(56) References Cited

U.S. PATENT DOCUMENTS 8,809,770 B2  8/2014  Bonner et al.
2009/0008548 A1*  1/2009  Yamaguchi ............ G16C 20/20
                                                                       250/288
(Continued)

FOREIGN PATENT DOCUMENTS

CN    108780066 A    11/2018
JP    2009-14424 A    1/2009
(Continued)

OTHER PUBLICATIONS

Written Opinion for PCT/JP2020/020470 dated Jul. 28, 2020.
(Continued)

*Primary Examiner* — Michael Maskell
(74) *Attorney, Agent, or Firm* — Sughrue Mion, PLLC

(57) ABSTRACT

A mode of a chromatograph mass spectrometer configured to collect chromatograph mass spectrometry data by repeatedly performing MS analysis and MS/MS analysis or only MS/MS analysis according to a predetermined condition in the mass spectrometer unit on a sample containing a compound separated by a chromatograph unit; a scatter diagram creation section (45) configured to create, based on the data collected by the measurement unit, a scatter diagram in which a retention time and a mass-to-charge ratio of precursor ions are set to axes orthogonal to each other and positions or ranges of the precursor ions from which MS/MS spectra are acquired are plotted; a spectrum creation unit (46) configured to create MS/MS spectra corresponding to the precursor ions indicated on the scatter diagram; and a (Continued)

display processing unit (48) configured to display the scatter diagram and the MS/MS spectra together on a screen of a display unit.

15 Claims, 5 Drawing Sheets

(58) Field of Classification Search
USPC .................................................. 250/281, 282
See application file for complete search history.

(56) References Cited

U.S. PATENT DOCUMENTS

| | | |
|---|---|---|
| 2019/0025253 A1 | 1/2019 | Yasuda |
| 2019/0043703 A1 | 2/2019 | Bern et al. |
| 2020/0152434 A1 | 5/2020 | Yamamoto et al. |

FOREIGN PATENT DOCUMENTS

| | | |
|---|---|---|
| JP | 2012-225862 A | 11/2012 |
| WO | 2017/158770 A1 | 9/2017 |
| WO | 2019012589 A1 | 1/2019 |

OTHER PUBLICATIONS

International Search Report for PCT/JP2020/020470 dated Jul. 28, 2020.
Office Action dated Jul. 4, 2023 issued for the corresponding Japanese Patent Application No. 2022-527261.
Chinese Office Action dated Mar. 29, 2024 in Application No. 202080100945.4.
Japanese Office Action dated Oct. 3, 2023 in Japanese Application No. 2022-527261.

* cited by examiner

CHROMATOGRAPH MASS SPECTROMETRY DATA PROCESSING METHOD, CHROMATOGRAPH MASS SPECTROMETER, AND CHROMATOGRAPH MASS SPECTROMETRY DATA PROCESSING PROGRAM

This Application is a National Stage of International Application No. PCT/JP2020/020470 filed May 25, 2020.

TECHNICAL FIELD

The present invention relates to a chromatograph mass spectrometry data processing method for processing data collected by chromatograph mass spectrometry, a chromatograph mass spectrometer using the method, and a chromatograph mass spectrometry data processing program for realizing the method using a computer.

BACKGROUND ART

In recent years, use of a liquid chromatograph mass spectrometer (LC-MS) using a tandem mass spectrometer as a detector has been rapidly developed in a field requiring qualitative and quantitative analysis of multiple specimens and multiple components, such as residual agricultural chemical inspection in food and contaminant inspection in environmental water. In particular, a quadrupole time-of-flight mass spectrometer (Q-TOF mass spectrometer), which uses a time-of-flight mass separator as the rear-stage mass separator, can perform a measurement with higher levels of mass accuracy and mass-resolving power than commonly used triple quadrupole mass spectrometers, and therefore, has exhibited its effectiveness in the qualitative and quantitative determination of compounds contained in a complex sample.

In an LC-MS using such a tandem mass spectrometer as a detector, as a method of MS/MS analysis in the mass spectrometry unit, a method called data dependent analysis (DDA: Data Dependent Analysis or Data Dependent Acquisition) and a method called data independent analysis (DIA: Data Independent Analysis or Data Independent Acquisition) are adopted (See Patent Literatures 1 and 2, etc.).

The DDA is a method in which firstly a mass spectrum is acquired by normal mass spectrometry, which is hereinafter referred to as "MS analysis". (Hereinafter, a mass spectrum obtained by MS analysis is referred to as "MS spectrum".) Subsequent to the MS analysis, MS/MS analysis is performed using ions having a specific mass-to-charge ratio (which is officially denoted in italicized m/z, but the term "mass-to-charge ratio" conventionally used is used herein) selected on the basis of signal intensity of the peaks observed in the MS spectrum as precursor ions, and MS/MS spectra is acquired in which various product ions are observed. In the DDA, when there is no peak satisfying an appropriate condition in the MS spectrum, the MS/MS analysis is not performed.

On the other hand, the DIA is a method in which a mass-to-charge ratio range to be measured is divided into a plurality of portions, and mass windows are set for each portion. Ions having mass-to-charge ratios included in each mass window are collectively set as precursor ions, and product ions generated from the precursor ions are comprehensively scanned and measured to obtain MS/MS spectra for each mass window.

Unlike the DDA that performs MS/MS analysis using ions having a specific mass-to-charge ratio as precursor ions, in the DIA, MS/MS analysis is performed using a plurality of ions included in a mass window as precursor ions, and a plurality of MS/MS analyses are performed for mass windows in different mass-to-charge ratio ranges within a time that can be regarded as substantially simultaneous. Therefore the coverage of the MS/MS spectra is high, so that the DIA is a suitable method for broadly and comprehensively qualitative and quantitative determination of a large number of compounds contained in a sample.

In any method, in the LC-MS as described above, data constituting MS spectra and data constituting one or a plurality of MS/MS spectra targeting precursor ions observed on the MS spectra or data constituting one or a plurality of MS/MS spectra targeting precursor ions to be observed on the MS spectra over the entire measurement period from a sample supply time point to a measurement end time point in the liquid chromatograph or in a specific retention time range are collected and stored. After completion of the measurement, various graphs such as a mass spectrum and a chromatogram are created on the basis of the data thus stored, and identification processing, quantitative processing, and the like of the compound or compounds in the sample are performed using a computer.

Patent Literature 3 discloses a data processing technique for displaying an MS spectrum created based on data obtained by the LC-MS and an MS/MS spectrum related to the MS spectrum (further, an $MS^n$ spectrum in which n is 3 or more). In this technique, a spectrum tree display region and a spectrum display region are provided in a window displayed on a screen of a display unit, and character information indicating a relationship between an analysis condition (m/z value of precursor ions, retention time, or the like) and an MS spectrum and an $MS^n$ spectrum collected under the analysis condition is indicated in a tree structure in the spectrum tree display region. Then, the MS spectrum and the $MS^n$ spectrum corresponding to a part selected by the user in the spectrum tree display region are displayed in the spectrum display region.

CITATION LIST

Patent Literature

Patent Literature 1: WO 2019/012589 A
Patent Literature 2: U.S. Pat. No. 8,809,770 B
Patent Literature 3: WO 2017/158770 A

SUMMARY OF INVENTION

Technical Problem

In the display format as described above, a relationship between a certain MS spectrum and the MS/MS spectrum related to the MS spectrum is easy to grasp. However, there is a problem that it is difficult to understand the overall MS/MS analysis results, such as: in which retention time range in the entire measurement period and for what m/z value of precursor ions the MS/MS spectrum was obtained, or in which retention time in the entire measurement period many MS/MS spectra were acquired. Furthermore, it takes time and labor for the user to understand the overall MS/MS analysis results and then confirm a focused MS/MS spectrum in detail.

Here, an LC-MS is described as an example, but the same applies to a gas chromatograph mass spectrometer (GC-MS). In the following description, the liquid chromatograph (LC) and the gas chromatograph (GC) are collectively referred to simply as a chromatograph.

The present invention has been made to solve the above problems, and a main object of the present invention is to provide a chromatograph mass spectrometry data processing method, a chromatograph mass spectrometer, and a chromatograph mass spectrometry data processing program capable of efficiently analyzing MS/MS analysis results by enabling a user to confirm the overall MS/MS analysis results or to confirm in detail the results of interest in the entire MS/MS analysis results by a simple operation.

Solution to Problem

One mode of a chromatograph mass spectrometry data processing method according to the present invention made to solve the above problems is a chromatograph mass spectrometry data processing method of processing chromatograph mass spectrometry data collected by a measurement unit in which a chromatograph and a mass spectrometry unit capable of MS/MS analysis are combined, the chromatograph mass spectrometry data processing method including:

- a scatter diagram creation step of creating, based on the collected data, a scatter diagram in which a retention time and a mass-to-charge ratio of precursor ions are set as axes orthogonal to each other and positions or ranges of the precursor ions from which MS/MS spectra are acquired are plotted;
- a spectrum creation step of creating, based on the collected data, MS/MS spectra corresponding to the precursor ions indicated on the scatter diagram; and
- a display processing step of displaying the scatter diagram and the MS/MS spectra together on a screen of a display unit.

One mode of a chromatograph mass spectrometer according to the present invention made to solve the above problems includes:

- a measurement unit including a chromatograph unit and a mass spectrometry unit capable of performing MS/MS analysis, and configured to collect chromatograph mass spectrometry data by repeatedly performing MS analysis and MS/MS analysis or only MS/MS analysis according to a predetermined condition in the mass spectrometry unit on a sample containing a compound separated by the chromatograph unit;
- a scatter diagram creation unit configured to create, based on the data collected by the measurement unit, a scatter diagram in which a retention time and a mass-to-charge ratio of precursor ions are set as axes orthogonal to each other and positions or ranges of the precursor ions from which MS/MS spectra are acquired are plotted;
- a spectrum creation unit configured to create, based on the data collected by the measurement unit, MS/MS spectra corresponding to the precursor ions indicated on the scatter diagram; and
- a display processing unit configured to display the scatter diagram and the MS/MS spectra together on a screen of a display unit.

One mode of a chromatograph mass spectrometry data processing program according to the present invention made to solve the above problems is a chromatograph mass spectrometry data processing program that, using a computer, processes chromatograph mass spectrometry data collected by a measurement unit in which a chromatograph and a mass spectrometry unit capable of MS/MS analysis are combined, the program causing the computer to operate as:

- a scatter diagram creation function unit configured to create, based on the collected data, a scatter diagram in which a retention time and a mass-to-charge ratio of precursor ions are set as axes orthogonal to each other and positions or ranges of the precursor ions from which MS/MS spectra are acquired are plotted;
- a spectrum creation function unit configured to create, based on the collected data, MS/MS spectra corresponding to the precursor ions indicated on the scatter diagram; and
- a display processing function unit configured to display the scatter diagram and the MS/MS spectra together on a screen of a display unit.

The chromatograph may be either a liquid chromatograph or a gas chromatograph.

The MS/MS analysis performed by the mass spectrometry unit may be either the data dependent analysis (DDA) or the data independent analysis (DIA) described above, or other methods (For example, the MS/MS analysis is performed on precursor ions having a predetermined specific mass-to-charge ratio within a predetermined retention time range.).

Advantageous Effects of Invention

According to the one mode of the chromatograph mass spectrometry data processing method, the chromatograph mass spectrometer, and the chromatograph mass spectrometry data processing program according to the present invention, the user can easily comprehend the retention time range in which the MS/MS analysis was performed and the mass-to-charge ratio values of the precursor ions in the MS/MS analysis from the displayed scatter diagram. The specific retention time indicated on the scatter diagram and the MS/MS spectra for the precursor ions can also be confirmed. As a result, it is possible to grasp the overall MS/MS analysis, and to easily confirm the MS/MS analysis result in detail under a specific condition that the user is interested in.

DESCRIPTION OF EMBODIMENTS

Hereinafter, an LC-MS analysis system which is an embodiment of a chromatograph mass spectrometer according to the present invention will be described with reference to the accompanying drawings.

[Configuration of LC-MS Analysis System]

Figure 1:
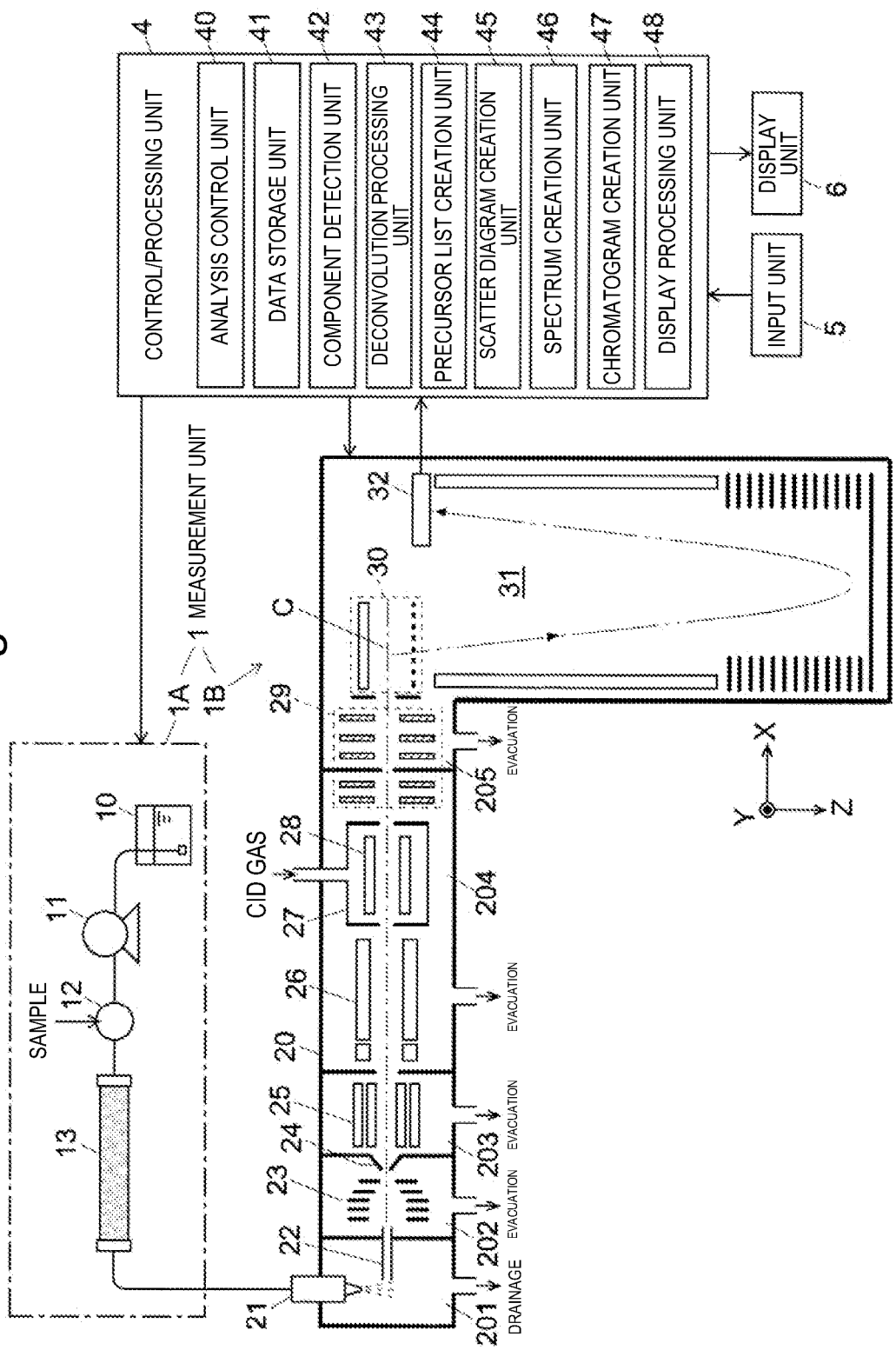
FIG. 1 is a schematic configuration diagram of an LC-MS analysis system according to an embodiment of the present invention.

FIG. 1 is a schematic configuration diagram of the LC-MS analysis system of the present embodiment.

As illustrated in FIG. 1, the LC-MS analysis system includes a measurement unit 1 including a liquid chromatograph unit 1A and a mass spectrometry unit 1B, a control/processing unit 4, an input unit 5, and a display unit 6.

The liquid chromatograph unit 1A includes a mobile phase container 10 in which a mobile phase is stored, a liquid feeding pump 11 that sucks the mobile phase and delivers the mobile phase at a substantially constant flow rate, an injector 12 that supplies a sample liquid into the mobile phase, and a column 13 that temporally separates various compounds contained in the sample liquid.

The mass spectrometry unit 1B is a quadrupole-time-of-flight (Q-TOF) mass spectrometer, and includes an ionization chamber 201 which is a substantially atmospheric pressure atmosphere, and a vacuum chamber 20 whose inside is partitioned into four. In the vacuum chamber 20, a first intermediate vacuum chamber 202, a second intermediate vacuum chamber 203, a first high vacuum chamber 204, and a second high vacuum chamber 205 are provided, and each chamber is evacuated by a vacuum pump so that a degree of vacuum increases in this order. That is, the mass spectrometry unit 1B adopts a configuration of a multi-stage differential exhaust system.

An electrospray ionization (ESI) probe 21 to which an eluate is supplied from an outlet of the column 13 is disposed in the ionization chamber 201, and the ionization chamber 201 and the first intermediate vacuum chamber 202 communicate with each other through a desolvation tube 22 having a small diameter. The first intermediate vacuum chamber 202 and the second intermediate vacuum chamber 203 communicate with each other through an orifice formed at a top of a skimmer 24, and ion guides 23 and 25 are disposed in the first intermediate vacuum chamber 202 and the second intermediate vacuum chamber 203, respectively. In the first high vacuum chamber 204, a quadrupole mass filter 26 and a collision cell 27 in which an ion guide 28 is disposed are provided. A plurality of electrodes arranged across the first high vacuum chamber 204 and the second high vacuum chamber 205 constitute an ion guide 29. Further, in the second high vacuum chamber 205, a time-of-flight mass separator of an orthogonal acceleration system including an orthogonal acceleration unit 30 and an ion flight unit 31 having a reflectron, and an ion detector 32 are provided.

The control/processing unit 4 includes, as functional blocks, an analysis control unit 40, a data storage unit 41, a component detection unit 42, a deconvolution processing unit 43, a precursor list creation unit 44, a scatter diagram creation unit 45, a spectrum creation unit 46, a chromatogram creation unit 47, and a display processing unit 48.

In general, the entity of the control/processing unit 4 is a personal computer, a workstation, or the like, and each functional block described above can be embodied by executing one or a plurality of dedicated software (computer programs) installed in such a computer in the computer. Such a computer program can be stored in a non-transitory computer-readable recording medium such as a CD-ROM, a DVD-ROM, a memory card, or a USB memory (dongle) and provided to the user. Alternatively, the information can be provided to the user in the form of data transfer via a communication line such as the Internet. Alternatively, the system can be pre-installed on a computer that is a part of the system when the user purchases the system.

[Analysis Operation of LC-MS Analysis System]

The analysis control unit 40 controls the measurement unit 1 to perform LC/MS analysis on the prepared sample.

Next, a typical measurement operation executed under the control of the analysis control unit 40 will be schematically described.

In this LC-MS analysis system, it is possible to selectively perform normal mass spectrometry (MS analysis) without ion dissociation and MS/MS (=$MS^2$) analysis in which ions are dissociated by collision-induced dissociation (CID).

In the liquid chromatograph unit 1A, the liquid feeding pump 11 sucks the mobile phase from the mobile phase container 10 and feeds the mobile phase to the column 13 at a substantially constant flow rate. In response to an instruction from the analysis control unit 40, the injector 12 supplies the sample into the mobile phase. The sample is carried on the mobile phase and introduced into the column 13, and the components in the sample are temporally separated while passing through the column 13. The eluate from an outlet of the column 13 is introduced into the ESI probe 21, and the ESI probe 21 nebulizes the eluate into the ionization chamber 201 as charged droplets. In a process in which the charged droplets are refined and the solvent in the droplets are vaporized, the compound in the droplets becomes a gas ion.

The generated ions are sent into the first intermediate vacuum chamber 202 through the desolvation tube 22, sequentially pass through the ion guide 23, the skimmer 24, and the ion guide 25, and are introduced into the quadrupole mass filter 26 in the first high vacuum chamber 204. In the case of the MS analysis, ions are transported almost without passing through the quadrupole mass filter 26 and the collision cell 27 to the orthogonal acceleration unit 30. On the other hand, in the case of the MS/MS analysis, a predetermined voltage is applied to each of a plurality of rod electrodes constituting the quadrupole mass filter 26, and an ion species having a specific mass-to-charge ratio according to the voltage or an ion species included in a specific mass-to-charge ratio range according to the voltage is selected as a precursor ion and passes through the quadrupole mass filter 26. A collision gas such as Ar gas is introduced into the collision cell 27, and the precursor ions come into contact with the collision gas and are dissociated by the CID to generate various product ions. The generated product ions are transported to the orthogonal acceleration unit 30 via the ion guide 29.

Depending on kinetic energy (collision energy) of the ions when the precursor ions are incident on the collision cell 27, a mode of dissociation of the ions is different. Therefore, even if the precursor ions are the same, the type of product ions to be generated can be changed by appropriately adjusting the collision energy. Not all the precursor ions can be dissociated, but some of the precursor ions can be left without being dissociated. As is well known, generally, the collision energy is determined by a voltage difference between a DC bias voltage applied to the quadrupole mass filter 26 and a DC voltage applied to a lens electrode disposed at an ion inlet of the collision cell 27.

In the orthogonal acceleration unit 30, ions are accelerated substantially simultaneously in a direction (Z-axis direction) substantially orthogonal to an incident direction (X-axis direction). The accelerated ions fly at a speed corresponding to the mass-to-charge ratio, turn back and fly as indicated by a two-dot chain line in FIG. 1 in the ion flight unit 31, and reach the ion detector 32. Various ions substantially simultaneously started from the orthogonal acceleration unit 30 reach the ion detector 32 in ascending order of mass-to-charge ratio and are detected, and the ion detector 32 outputs a detection signal (ionic intensity signal) corresponding to the number of ions to the control/processing unit 4.

In the control/processing unit 4, the data storage unit 41 digitizes the detection signal, and further converts the time of flight from a time point at which the ions are ejected from the orthogonal acceleration unit 30 into a mass-to-charge ratio, thereby acquiring and storing mass spectrum data (raw data). The orthogonal acceleration unit 30 repeatedly ejects ions toward the ion flight unit 31 at a predetermined cycle. As a result, the data storage unit 41 can repeatedly acquire mass spectrum data over a predetermined mass-to-charge ratio range at a predetermined cycle.

In the LC/MS analysis, it is often difficult to perform a plurality of measurements on one sample. Therefore, it is necessary to collect as much information as possible on a large number of compounds contained in the sample by one measurement (one sample supply). Correspondingly, in the LC-MS analysis system of the present embodiment, measurement in a plurality of analysis modes including the above-described DDA and DIA is possible.

[Description of Operation in DDA Mode]

Figure 2:
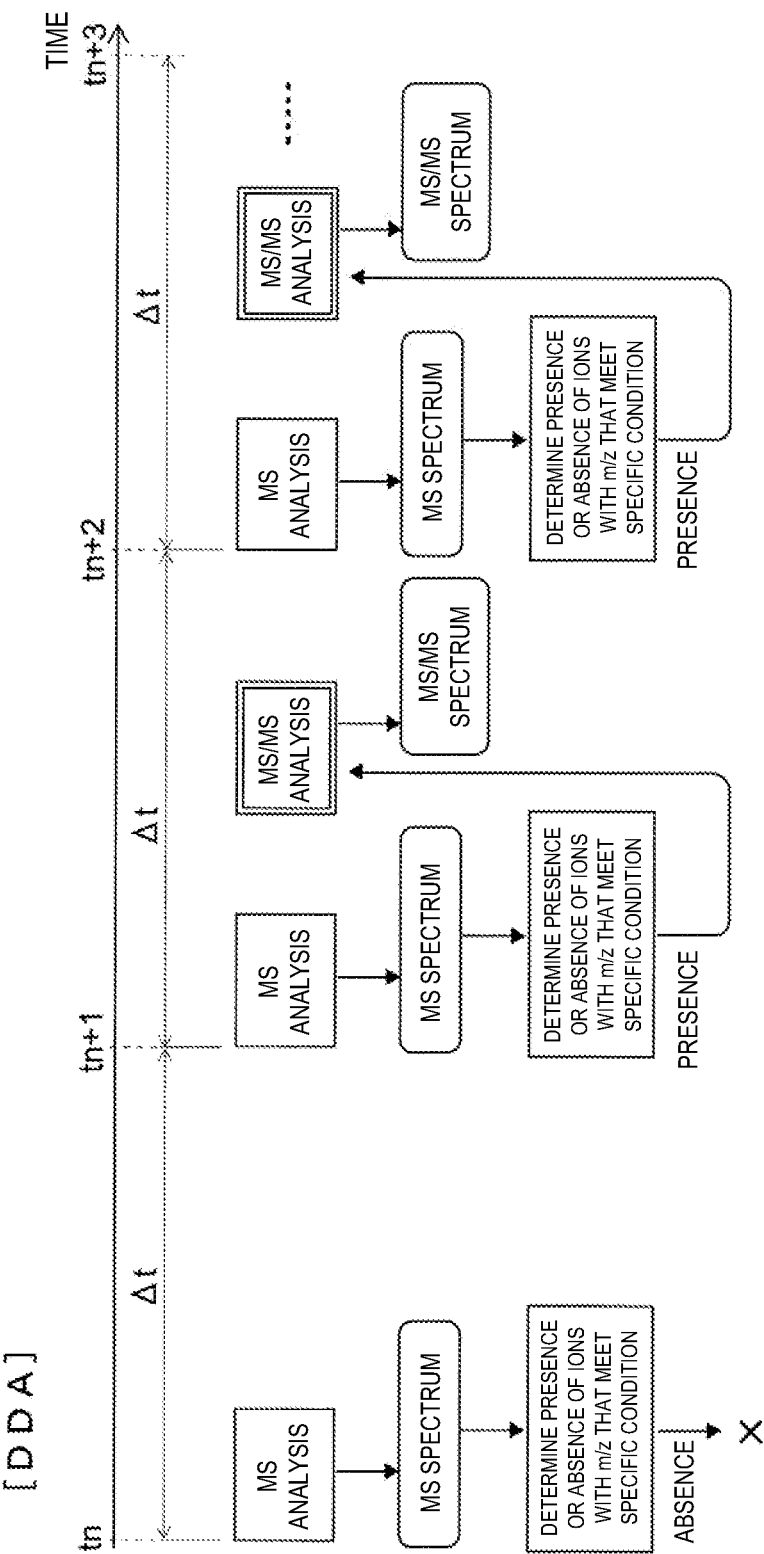
FIG. 2 is a schematic diagram illustrating analysis in a DDA mode in the LC-MS analysis system of the present embodiment.

FIG. 2 is a schematic diagram illustrating a flow of analysis in the DDA mode. In the DDA, the MS analysis over a predetermined mass-to-charge ratio range is typically repeated at a constant period (time. At interval in FIG. 2). The control/processing unit 4 creates an MS spectrum immediately every time the MS analysis is performed, and checks whether or not an ion peak observed in the MS spectrum meets a preset specific condition. Then, when there is a peak that meets the specific condition, the MS/MS analysis using ions having a mass-to-charge ratio corresponding to the peak as precursor ions is performed subsequently to the MS analysis. This makes it possible to acquire an MS/MS spectrum in which various product ions generated from the precursor ions are observed.

The specific condition can be, for example, a condition having the maximum ionic intensity. In the example illustrated in FIG. 2, only one MS/MS analysis is performed following the MS analysis. However, if there is a time margin, multiple MS/MS analyses for precursor ions different from each other can be performed following one MS analysis. In that case, for example, a predetermined number of peaks are selected in descending order of ionic intensity among peaks observed in the MS spectrum, and ions having a mass-to-charge ratio corresponding to the peaks can be used as precursor ions. As can also be seen from FIG. 2, in the DDA, an MS/MS spectrum corresponding to an MS spectrum obtained at a certain retention time does not necessarily exist.

In the DDA, MS spectrum data obtained by the MS analysis and MS/MS spectrum data obtained by the MS/MS analysis can be stored in different data files for each analysis. In that case, information such as a retention time (tn, tn+1, . . . ) at which the data is collected and a mass-to-charge ratio value of precursor ions (in the case of the MS/MS spectra) is also recorded in each data file. The MS spectrum data and the MS/MS spectrum data acquired at the same retention time (tn, tn+1, . . . ) may be stored in the same data file.

[Description of Operation in DIA Mode]

Figure 3:
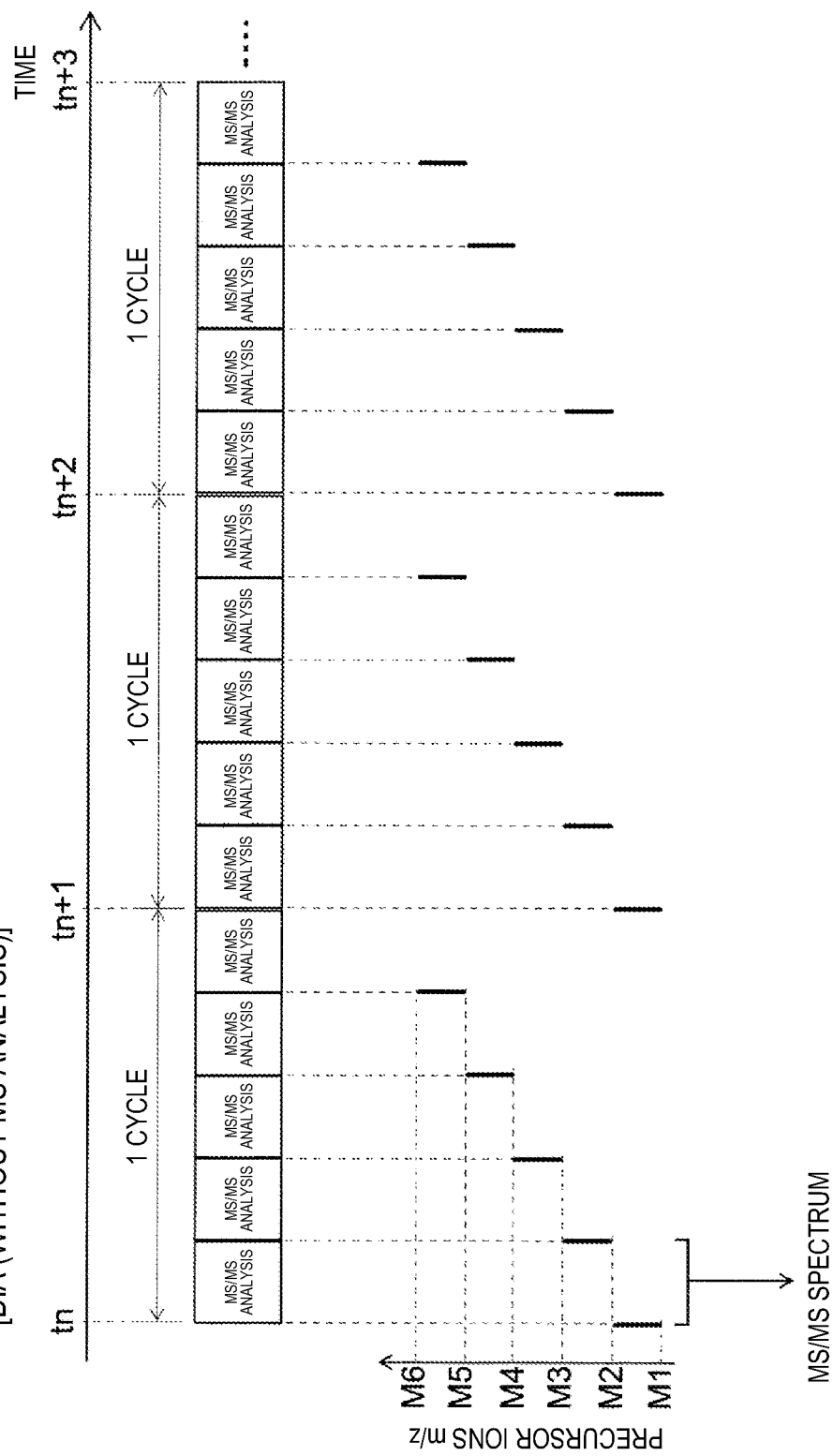
FIG. 3 is a schematic diagram illustrating analysis in a DIA mode (without MS analysis) in the LC-MS analysis system of the present embodiment.
Figure 4:
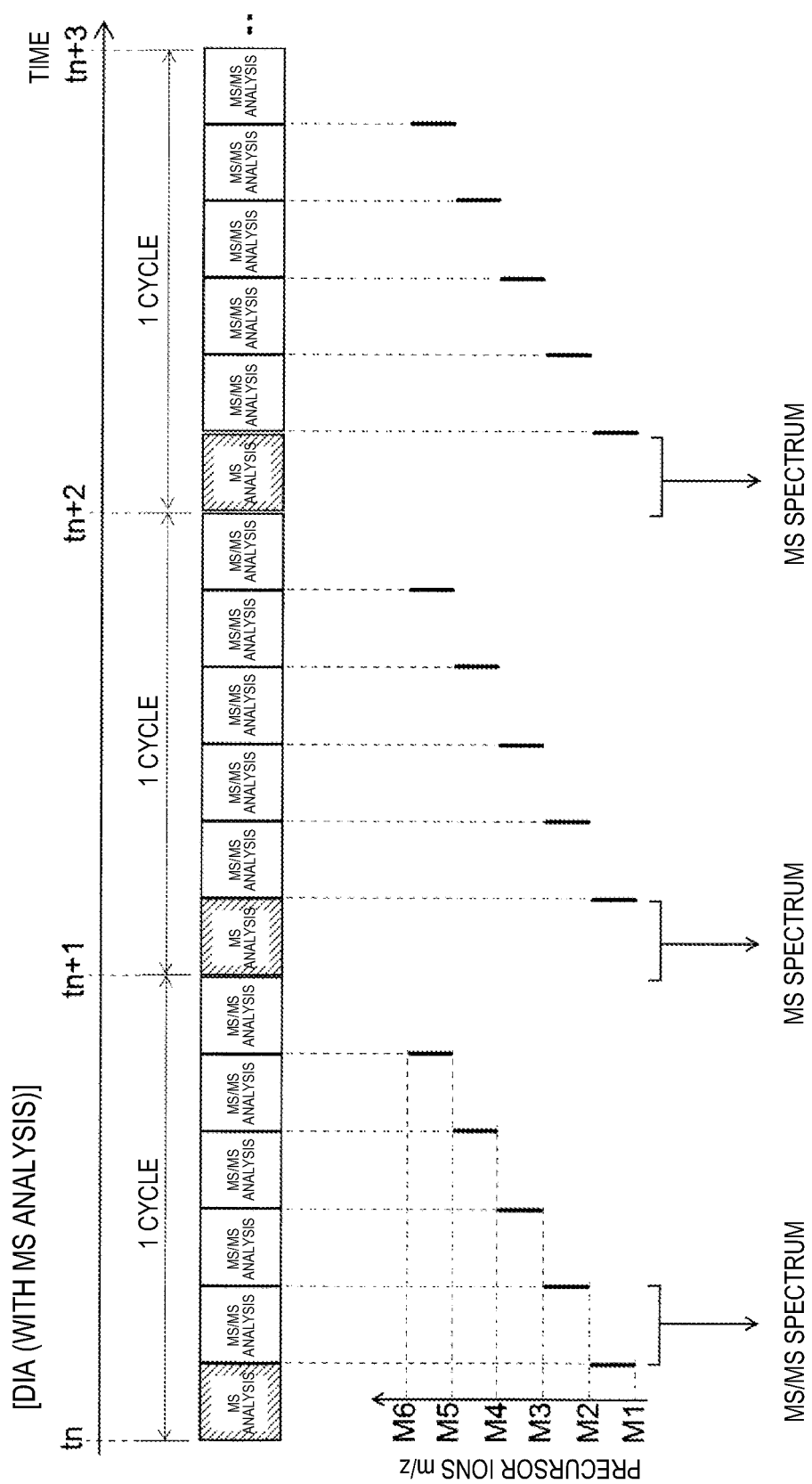
FIG. 4 is a schematic diagram illustrating analysis in the DIA mode (with MS analysis) in the LC-MS analysis system of the present embodiment.

FIGS. 3 and 4 are explanatory diagrams of analysis in the DIA mode. FIG. 3 is an example of a case where the MS analysis is not performed, and FIG. 4 is an example of a case where the MS analysis is periodically performed.

In the DIA, the entire mass-to-charge ratio range to be measured is divided into a plurality of parts, mass windows are set for the respective parts, ions having mass-to-charge ratios included in the respective mass windows are collectively selected as precursor ions, and MS/MS analysis is performed.

In the examples of FIGS. 3 and 4, the mass-to-charge ratio ranges M1 to M6 are divided into five, and MS/MS analysis targeting ions having mass-to-charge ratios respectively included in the five mass windows is performed. Since one MS/MS spectrum is obtained for each mass window, five MS/MS spectra are obtained in one cycle in the examples of FIGS. 3 and 4, and product ions derived from all the compounds introduced into the mass spectrometry unit 1B at that time appear in the five MS/MS spectra. That is, comprehensive product ion information on all the compounds can be obtained. As described above, when the collision energy at the time of the CID is adjusted, for example, when the collision energy is adjusted to a relatively low value, it is possible to avoid complete dissociation of the precursor ions. Therefore, a peak of the precursor ions themselves is also observed in the MS/MS spectrum. Therefore, for example, when a plurality of MS/MS spectra are acquired in which the collision energy is changed to a plurality of values including a relatively high value and a relatively low value in one cycle and the collision error is changed for each of the mass-to-charge ratio ranges M1 to M6, and one MS/MS spectrum is created by adding or averaging the plurality of MS/MS spectra, information on all product ions of the compound to be measured or information on both product ions and precursor ions can be obtained in the retention time.

By adjusting the collision energy as described above, it is possible to obtain an MS/MS spectrum in which a peak of the precursor ion itself is substantially observed. In this case, as illustrated in FIG. 3, since it is not necessary to perform the MS analysis, the time of one cycle can be shortened accordingly. On the other hand, in the DIA illustrated in FIG. 4, since the MS analysis over a predetermined mass-to-charge ratio range is performed once per cycle, an MS spectrum can be acquired separately from the MS/MS spectrum. Therefore, it is not necessary to acquire information on the precursor ions at the time of the MS/MS analysis, and for example, all the precursor ions may be dissociated by the CID at the time of the MS/MS analysis. Therefore, the signal intensity of product ions in the MS/MS spectrum is increased, and the sensitivity can be improved.

FIGS. 3 and 4 are simplified diagrams for explanation, and in general, the number of mass windows is larger, and the mass-to-charge ratio width of one mass window is in a range of about 10 to 100 Da, for example, 20 Da.

In the DIA, MS spectrum data obtained by the MS analysis and MS/MS spectrum data obtained by the MS/MS analysis can be stored in different data files for each analysis. MS spectrum data and a plurality of pieces of MS/MS spectrum data acquired at the same retention time (tn, tn+1, . . . ), or a plurality of pieces of MS/MS spectrum data may be stored in the same data file.

[Display Processing in LC-MS Analysis System of Present Embodiment]

When the LC/MS analysis using the DDA or the DIA as described above is performed on one sample, a data file storing MS spectrum data and/or MS/MS spectrum data corresponding to the LC/MS analysis is stored in the data storage unit 41. Characteristic data processing executed in the LC-MS analysis system of the present embodiment in a state where such data is stored will be described below. This data processing is processing of displaying an analysis result display screen (window) as illustrated in FIG. 5 on a screen of the display unit 6 on the basis of the collected data.

Figure 5:
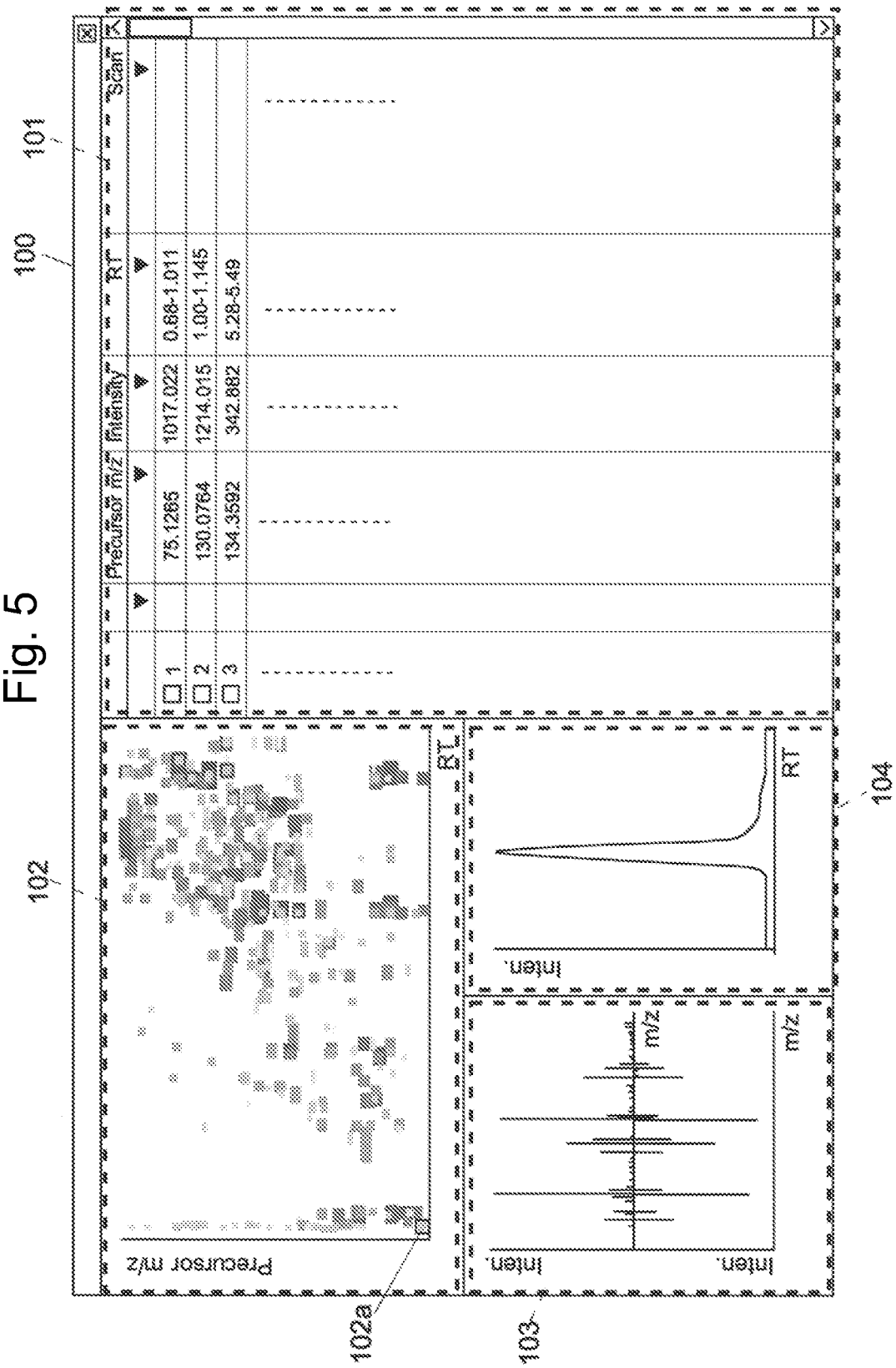
FIG. 5 is a diagram illustrating an example of an analysis result display screen in the LC-MS analysis system of the present embodiment.

As illustrated in FIG. 5, an analysis result display screen 100 is provided with a precursor ion list display region 101, a scatter diagram display region 102, a spectrum display region 103, and a chromatogram display region 104.

In the precursor ion list display region 101, a precursor ion table in which information on all precursor ions detected in data collected in LC/MS analysis for one sample is listed is arranged. In this table, one row corresponds to one precursor ion, and information such as a mass-to-charge ratio value, a signal intensity value (maximum value), and a retention time range of the precursor ion is illustrated.

In the scatter diagram display region 102, a scatter diagram in which a horizontal axis represents a retention time and a vertical axis represents a mass-to-charge ratio value of precursor ions is arranged. A plot corresponding to one precursor ion on the scatter diagram has a rectangular shape, and a width (length in the horizontal axis direction) of the plot indicates a width (retention time width) of a peak on an extracted ion chromatogram (XIC) at the mass-to-charge ratio of the precursor ion. A display color of the plot is indicated by a brightness proportional to a signal intensity of the peak corresponding to the precursor ion (for example, an area value of the peak on the XIC).

In the spectrum display region 103, an actually measured product ion spectrum (MS/MS spectrum) corresponding to one row in the precursor ion table and one plot on the scatter diagram and associated with the precursor ion designated in any one of them is arranged. However, when the MS/MS analysis is in the DIA mode, a deconvolution spectrum created by calculation is also displayed in addition to the actually measured MS/MS spectrum. FIG. 5 illustrates an example in which an actually measured MS/MS spectrum and a deconvolution spectrum are displayed vertically in the spectrum display region 103. The deconvolution spectrum will be described later.

In the chromatogram display region 104, the extracted ion chromatogram at the mass-to-charge ratio value of the precursor ion designated on the precursor ion table or the scatter diagram as described above is arranged.

Next, a processing operation when the above-described display processing is performed in the control/processing unit 4 will be described.

When processing data collected in the DDA mode, a precursor ion table is created as follows.

As described above, when the MS/MS analysis in the DDA mode is performed, information on precursor ions detected on the MS spectrum and targeted by the MS/MS analysis is stored together with data. Therefore, the precursor list creation unit 44 extracts information of all precursor ions from data stored in the data storage unit 41, and creates a precursor ion table on the basis of the information. When the DDA mode is executed, information indicating conditions of precursor ions when the MS/MS analysis is executed, for example, whether precursor ions are selected based on signal intensity of an ion peak on an MS spectrum, or whether precursor ions are selected by detecting ions having a specific mass-to-charge ratio or falling within a specific mass-to-charge ratio range is also listed in the precursor ion table.

On the other hand, when the MS/MS analysis in the DIA mode is performed, the target of the acquired MS/MS spectrum is not limited to one ion, and usually ions having a plurality of mass-to-charge ratios included in a mass window having a predetermined mass-to-charge ratio width become precursor ions. Therefore, first, the component detection unit 42 detects a compound and a component that is a partial structure of the compound using a predetermined component detection algorithm for all the collected MS/MS spectra, and estimates precursor ions for each MS/MS spectrum among the detected components. Then, the precursor list creation unit 44 creates a precursor ion table on the basis of the information of the estimated precursor ions.

The detection of the component and the estimation of the precursor ions can be performed by, for example, the following procedure.

The component detection unit 42 reads data collected by the LC/MS analysis from the data storage unit 41, and performs centroid conversion processing for each data constituting one MS/MS spectrum to obtain an MS/MS spectrum that is a bar graph display. For example, in the examples of FIGS. 3 and 4, five MS/MS spectra having different mass windows per cycle are obtained.

Next, the component detection unit 42 detects a compound contained in the sample and a significant component estimated to correspond to a partial structure of the compound from all the obtained MS/MS spectra. The term "component" as used herein basically corresponds to a peak observed in a three-dimensional graph of a mass-to-charge ratio axis, a time axis, and a signal intensity axis, but peaks having different mass-to-charge ratios derived from one compound or derived from one partial structure of one compound, that is, a plurality of peaks constituting an isotope cluster are aggregated and regarded as one component. In addition, the component detection unit 42 estimates, for each MS/MS spectrum, a peak having the highest signal intensity among peaks present in a mass-to-charge ratio range of a mass window corresponding to the MS/MS spectrum as a precursor ion peak. Therefore, different precursor ions are determined for each MS/MS spectrum. Information on the mass-to-charge ratio value and the retention time range of the component corresponding to this peak is used to create a precursor ion table as information on precursor ions.

When the MS analysis is performed even in the DIA mode, it can be estimated that, for each mass window in the MS spectrum rather than the MS/MS spectrum, a peak having the highest signal intensity among peaks present in the mass-to-charge ratio range of the mass window is the precursor ion peak.

When the precursor ion table is created as described above, the scatter diagram creation unit 45 determines the width and the display color of the plot corresponding to each of the precursor ions on the basis of the information on the mass-to-charge ratio values, the signal intensity values, and the retention times of all the precursor ions listed in the precursor ion table, and creates the scatter diagram. As illustrated in FIG. 5, a quadrangular frame-shaped marker 102a is displayed in one of many plots on the scatter diagram, and a row on the precursor ion table in which information on the precursor ions indicated by the marker 102a is described is displayed to be conspicuous in a background color different from other rows.

As described above, in the case of no MS analysis in the DIA mode, all the precursor ions on the precursor ion table are derived from the MS/MS spectrum. Thus, all plots on the scatter diagram are also based on information derived from the MS/MS spectra.

The spectrum creation unit 46 acquires, from the data storage unit 41, MS/MS spectrum data associated with precursor ions corresponding to the row indicated by the marker 102a on the scatter diagram and clearly indicated by the background color on the precursor ion table, and creates an MS/MS spectrum from the data. In the DDA mode, this MS/MS spectrum is a product ion spectrum corresponding to a specific kind of precursor ion.

On the other hand, in the DIA mode, the MS/MS spectrum is an MS/MS spectrum in which product ions derived from a plurality of types of precursor ions are mixed. However, in many cases, what the user wants to confirm is an MS/MS spectrum in which only product ions derived from a kind of precursor ions are observed.

Therefore, in the LC-MS analysis system of the present embodiment, the following processing is further executed when processing the data collected in the DIA mode.

When a component is detected from the MS/MS spectrum by the component detection unit 42, the deconvolution processing unit 43 performs processing of attributing a component (mass peak) estimated to be a product ion in the component detection result to the precursor ion. For such processing, for example, a known technique called in silico fragment mapping or the like can be used. That is, for example, a mass-to-charge ratio range in which a predetermined allowable width is applied to the mass-to-charge ratio value of each component that is a product ion is used as a search key to perform a search on a known chemical structure database. When composition estimation is performed using a precise mass-to-charge ratio value, and a chemical formula (ionic formula) is obtained as a result of the composition estimation, a known chemical structure database can be searched using the chemical formula as a search key.

When the attribution of product ions to each precursor ion is determined in this way, information on a plurality of product ions attributed to a kind of precursor ion is collected, and a mass spectrum is created from the information, whereby a deconvolution spectrum can be obtained. That is, the deconvolution spectrum displayed in the spectrum display region 103 is a so-called virtual product ion spectrum created by calculation from data obtained by actual measurement. It is also possible to specify the compound by subjecting the deconvolution spectrum thus obtained to library search.

As described above, the chromatogram creation unit 47 acquires, from the data storage unit 41, data in the time direction corresponding to the mass-to-charge ratio of the precursor ions in the row indicated by the marker 102a on the scatter diagram and clearly indicated by the background color on the precursor ion table, and creates an extracted ion chromatogram on the basis of the data.

The display processing unit 48 creates the analysis result display screen 100 in which the precursor ion table, the scatter diagram, the MS/MS spectrum, and the extracted ion chromatogram created as described above are arranged in each of the display regions 101 to 104, and displays the analysis result display screen on the screen of the display unit 6. When the analysis result display screen 100 is first displayed, as an initial setting, the marker 102a on the scatter diagram can be displayed so as to indicate, for example, a plot corresponding to precursor ions having a retention time closest to zero and a mass-to-charge ratio minimum. Then, when the user selects and instructs an appropriate plot on the displayed scatter diagram by a click operation or the like by the input unit (pointing device such as mouse) 5, the display processing unit 48 moves the marker 102a and changes the row specified in the precursor ion table according to the instruction. The displayed MS/MS spectrum and extracted ion chromatogram are also updated in accordance with the change in the selection of precursor ions.

Furthermore, the selection of precursor ions can be changed by the user instructing an arbitrary row on the precursor ion table not on the scatter diagram but by a click operation or the like.

In this way, the user can confirm the MS/MS spectrum or the extracted ion chromatogram linked to the precursor ions by drawing the MS/MS spectrum or the extracted ion chromatogram only by performing a click operation on the scatter diagram or on the precursor ion table on the plot corresponding to the precursor ions to be confirmed in detail while confirming the overall relationship between the retention time and the mass-to-charge ratio of the precursor ions in the scatter diagram. Even when data collection is performed in the DIA mode, in addition to an MS/MS spectrum in which product ions derived from a plurality of precursor ions may be mixed, only a product ion derived from a kind of precursor ion is observed, so that a deconvolution spectrum can be confirmed together.

The above embodiment is an example of the present invention, and it is obvious that modifications, changes, and additions appropriately made within the scope of the gist of the present invention are included in the claims of the present application.

For example, the above embodiment is an LC-MS analysis system, but it is obvious that the present invention can also be applied to a GC-MS analysis system in which a chromatograph is a gas chromatograph.

In the system of the above embodiment, the quadrupole-time-of-flight mass spectrometer is used as the mass spectrometry unit 1B, but other tandem mass spectrometers such as a triple quadrupole mass spectrometer and an ion trap time-of-flight mass spectrometer can also be used.

[Various Modes]

It is apparent to those skilled in the art that the exemplary embodiments described above are specific examples of the following modes.

(Clause 1) One mode of a chromatograph mass spectrometry data processing method according to the present invention is a chromatograph mass spectrometry data processing method of processing chromatograph mass spectrometry data collected by a measurement unit in which a chromatograph and a mass spectrometry unit capable of MS/MS analysis are combined, the chromatograph mass spectrometry data processing method including:

a scatter diagram creation step of creating, based on the collected data, a scatter diagram in which a retention time and a mass-to-charge ratio of precursor ions are set as axes orthogonal to each other and positions or ranges of the precursor ions from which MS/MS spectra are acquired are plotted;

a spectrum creation step of creating, based on the collected data, MS/MS spectra corresponding to the precursor ions indicated on the scatter diagram; and a display processing step of displaying the scatter diagram and the MS/MS spectra together on a screen of a display unit.

(Clause 6) One mode of a chromatograph mass spectrometer according to the present invention made to solve the above problems includes:

a measurement unit including a chromatograph unit and a mass spectrometry unit capable of performing MS/MS analysis, and configured to collect chromatograph mass spectrometry data by repeatedly performing MS analysis and MS/MS analysis or only MS/MS analysis according to a predetermined condition in the mass spectrometry unit on a sample containing a compound separated by the chromatograph unit;

a scatter diagram creation unit configured to create, based on the data collected by the measurement unit, a scatter diagram in which a retention time and a mass-to-charge ratio of precursor ions are set as axes orthogonal to each other and positions or ranges of the precursor ions from which MS/MS spectra are acquired are plotted;

a spectrum creation unit configured to create, based on the data collected by the measurement unit, MS/MS spectra corresponding to the precursor ions indicated on the scatter diagram; and a display processing unit configured to display the scatter diagram and the MS/MS spectra together on a screen of a display unit.

(Clause 11) One mode of a chromatograph mass spectrometry data processing program according to the present invention made to solve the above problems is a chromatograph mass spectrometry data processing program that, using a computer, processes chromatograph mass spectrometry data collected by a measurement unit in which a chromatograph and a mass spectrometry unit capable of MS/MS analysis are combined, the program causing the computer to operate as:

a scatter diagram creation function unit configured to create, based on the collected data, a scatter diagram in which a retention time and a mass-to-charge ratio of precursor ions are set as axes orthogonal to each other and positions or ranges of the precursor ions from which MS/MS spectra are acquired are plotted;

a spectrum creation function unit configured to create, based on the collected data, MS/MS spectra corresponding to the precursor ions indicated on the scatter diagram; and a display processing function unit configured to display the scatter diagram and the MS/MS spectra together on a screen of a display unit.

According to the method described in Clause 1, the device described in Clause 6, and the program described in Clause 11, the user can easily comprehend the retention time range in which the MS/MS analysis was performed and the mass-to-charge ratio values of the precursor ions in the MS/MS analysis from the displayed scatter diagram. The specific retention time indicated on the scatter diagram and the MS/MS spectra for the precursor ions can also be confirmed. As a result, it is possible to grasp the overall MS/MS analysis, and to easily confirm the MS/MS analysis result in detail under a specific condition that the user is interested in.

(Clause 2, Clause 7, and Clause 12) In the method described in Clause 1, the device according to Clause 6, and the program according to Clause 11, a marker indicating one plot may be displayed on the scatter diagram, and an MS/MS spectrum associated with a precursor ion corresponding to the plot indicated by the marker may be displayed together with the scatter diagram.

According to the method described in Clause 2, the device described in Clause 7, and the program described in Clause 12, the user can easily confirm the MS/MS spectrum associated with the precursor ion of interest by performing a simple operation of appropriately switching the selection of the plot on the scatter diagram.

(Clause 3) In the method described in Clause 1, the mass spectrometry unit may perform MS/MS analysis which is data independent analysis, and in the scatter diagram creation step, the scatter diagram may be created on the basis of information on the precursor ions obtained from the MS/MS spectra.

(Clause 8) In the device described in Clause 6, the mass spectrometry unit may be configured to perform MS/MS analysis which is data independent analysis, and the scatter diagram creation unit may be configured to create the scatter diagram on the basis of information on the precursor ions obtained from the MS/MS spectra.

(Clause 13) In the program described in Clause 11, the mass spectrometry unit may be configured to perform MS/MS analysis which is data independent analysis, and the scatter diagram creation function unit may be configured to create the scatter diagram on the basis of information on the precursor ions obtained from the MS/MS spectra.

According to the method described in Clause 3, the device described in Clause 8, and the program described in Clause 13, a relationship between the retention time of precursor ions and the mass-to-charge ratio can be known even when data is collected by the data independent analysis (DIA) in which the MS/MS analysis is performed without specifying precursor ions. This makes it possible to comprehensively grasp information on the precursor ions.

(Clause 4) In the method described in Clause 1, the mass spectrometry unit may perform MS/MS analysis which is data independent analysis, and in the spectrum creation step, a deconvolution spectrum calculated by calculation may be displayed as an MS/MS spectrum.

(Clause 9) In the device described in Clause 6, the mass spectrometry unit may be configured to perform MS/MS analysis which is data independent analysis, and the spectrum creation unit may be configured to display a deconvolution spectrum calculated by calculation as an MS/MS spectrum.

(Clause 14) In the program described in Clause 11, the mass spectrometry unit may be configured to perform MS/MS analysis which is data independent analysis, and the spectrum creation function unit may be configured to display a deconvolution spectrum calculated by calculation as an MS/MS spectrum.

According to the method described in Clause 4, the device described in Clause 9, and the program described in Clause 14, even when data is comprehensively collected by the data independent analysis (DIA), a product ion spectrum derived from the precursor ions observed with a specific mass-to-charge ratio at a specific retention time can be confirmed.

(Clause 5) The method described in Clause 1 may further include a chromatogram creation step of creating, based on the collected data, an extracted ion chromatogram corresponding to one of the precursor ions indicated on the scatter diagram, and in the display processing step, the extracted ion chromatogram may be displayed on the same screen as the scatter diagram and the MS/MS spectra.

(Clause 10) The device described in Clause 6 may further include a chromatogram creation unit configured to create, based on the collected data, an extracted ion chromatogram corresponding to one of the precursor ions indicated on the scatter diagram, and the display processing unit may be configured to display the extracted ion chromatogram on the same screen as the scatter diagram and the MS/MS spectra.

(Clause 15) In the program described in Clause 11, the computer is further operated as a chromatogram creation function unit configured to create, based on the collected data, an extracted ion chromatogram corresponding to one of the precursor ions indicated on the scatter diagram, and the display processing function unit is configured to display the extracted ion chromatogram on the same screen as the scatter diagram and the MS/MS spectra.

According to the method described in Clause 5, the device described in Clause 10, and the program described in Clause 15, the peak waveform shape of the precursor ion of interest on the extracted ion chromatogram can also be confirmed. As a result, it is possible to confirm whether or not there is an overlap of ions derived from another compound in the precursor ion.

REFERENCE SIGNS LIST

1 . . . Measurement Unit
1A . . . Liquid Chromatograph Unit
10 . . . Mobile Phase Container
11 . . . Liquid Feeding Pump
12 . . . Injector
13 . . . Column
1B . . . Mass Spectrometry Unit
20 . . . Vacuum Chamber
201 . . . Ionization Chamber
202 . . . First Intermediate Vacuum Chamber
203 . . . Second Intermediate Vacuum Chamber
204 . . . First High Vacuum Chamber
205 . . . Second High Vacuum Chamber
21 . . . Electrospray Ionization (ESI) Probe
22 . . . Desolvation Tube
23 . . . Ion Guide
24 . . . Skimmer
25, 28, 29 . . . Ion Guide
26 . . . Quadrupole Mass Filter
27 . . . Collision Cell
30 . . . Orthogonal Acceleration Unit
31 . . . Ion Flight Unit
32 . . . Ion Detector
4 . . . Control/Processing Unit
40 . . . Analysis Control Unit
41 . . . Data Storage Unit
42 . . . Component Detection Unit
43 . . . Deconvolution Processing Unit
44 . . . Precursor List Creation Unit
45 . . . Scatter Diagram Creation Unit
46 . . . Spectrum Creation Unit
47 . . . Chromatogram Creation Unit
48 . . . Display Processing Unit
5 . . . Input Unit
6 . . . Display Unit

The invention claimed is:

1. A chromatograph mass spectrometry data processing method of processing chromatograph mass spectrometry data collected by a chromatograph mass spectrometer in which a chromatograph and a mass spectrometry unit capable of MS/MS analysis are combined, the chromatograph mass spectrometry data processing method comprising steps of:
performing MS/MS analysis using the chromatograph mass spectrometer;
creating, based on the collected data after the MS/MS analysis is performed, a scatter diagram using at least one processor, in which a retention time and a mass-to-charge ratio of precursor ions are set as axes orthogonal to each other and positions or ranges of the precursor ions from which MS/MS spectra are acquired are plotted;
displaying the scatter diagram on a screen of a display using the at least one processor;
receiving an input of a user which specifies a position or a range on the scatter diagram using the at least one processor; and
displaying an MS/MS spectrum corresponding to the position or range specified by the user together with the scatter diagram on the screen of the display using the at least one processor.

2. The chromatograph mass spectrometry data processing method according to claim 1, wherein a marker indicating one plot is displayed on the scatter diagram, and an MS/MS spectrum associated with a precursor ion corresponding to the plot indicated by the marker is displayed together with the scatter diagram.

3. The chromatograph mass spectrometry data processing method according to claim 1, wherein
the mass spectrometry unit performs MS/MS analysis which is data independent analysis, and
the scatter diagram is created based on information on the precursor ions obtained from the MS/MS spectra.

4. The chromatograph mass spectrometry data processing method according to claim 1, wherein
the mass spectrometry unit performs MS/MS analysis which is data independent analysis, and
a deconvolution spectrum calculated by calculation is displayed as an MS/MS spectrum.

5. The chromatograph mass spectrometry data processing method according to claim 1, further comprising
a step of creating, based on the collected data, an extracted ion chromatogram corresponding to one of the precursor ions indicated on the scatter diagram using the at least one processor,
wherein, the extracted ion chromatogram is displayed on the same screen as the scatter diagram and the MS/MS spectrum.

6. A chromatograph mass spectrometry system comprising:
a chromatograph mass spectrometer including a chromatograph unit and a mass spectrometry unit capable of performing MS/MS analysis, and configured to collect chromatograph mass spectrometry data by repeatedly performing MS analysis and MS/MS analysis or only MS/MS analysis according to a predetermined condition in the mass spectrometry unit on a sample containing a compound separated by the chromatograph unit;
a display; and
at least one processor configured to:
create, based on the data collected by the chromatograph mass spectrometer, a scatter diagram in which a retention time and a mass-to-charge ratio of precursor ions are set as axes orthogonal to each other and positions or ranges of the precursor ions from which MS/MS spectra are acquired are plotted;
display the scatter diagram on a screen of a display;
receive an input of a user which specifies a position or a range on the scatter diagram;
display an MS/MS spectrum corresponding to the position or range specified by the user together with the scatter diagram on the screen of the display.

7. The chromatograph mass spectrometer according to claim 6, wherein a marker indicating one plot is displayed on the scatter diagram, and an MS/MS spectrum associated with a precursor ion corresponding to the plot indicated by the marker is displayed together with the scatter diagram.

8. The chromatograph mass spectrometer according to claim 6, wherein
the mass spectrometry unit is configured to perform MS/MS analysis which is data independent analysis, and
the at least one processor is configured to create the scatter diagram based on information on the precursor ions obtained from the MS/MS spectra.

9. The chromatograph mass spectrometer according to claim 6, wherein
the mass spectrometry unit is configured to perform MS/MS analysis which is data independent analysis, and the at least one processor is configured to display a deconvolution spectrum calculated by calculation as an MS/MS spectrum.

10. The chromatograph mass spectrometer according to claim 6, wherein
the at least one processor is configured to create, based on the collected data, an extracted ion chromatogram corresponding to one of the precursor ions indicated on the scatter diagram, and to
display the extracted ion chromatogram on the same screen as the scatter diagram and the MS/MS spectra.

11. A non-transitory computer-readable recording medium storing a chromatograph mass spectrometry data processing program that, using a computer, processes chromatograph mass spectrometry data collected by a chromatograph mass spectrometer in which a chromatograph and a mass spectrometry unit capable of MS/MS analysis are combined, the program causing the computer to:
create, based on the collected data after MS/MS analysis is performed, a scatter diagram in which a retention time and a mass-to-charge ratio of precursor ions are set as axes orthogonal to each other and positions or ranges of the precursor ions from which MS/MS spectra are acquired are plotted;
display the scatter diagram on a screen of a display;
receive an input of a user which specifies a position or a range on the scatter diagram;
display an MS/MS spectrum corresponding to the position or range specified by the user together with the scatter diagram on the screen of the display.

12. The non-transitory computer-readable recording medium storing a chromatograph mass spectrometry data processing program according to claim 11, wherein a marker indicating one plot is displayed on the scatter diagram, and an MS/MS spectrum associated with a precursor ion corresponding to the plot indicated by the marker is displayed together with the scatter diagram.

13. The non-transitory computer-readable recording medium storing a chromatograph mass spectrometry data processing program according to claim 11, wherein
the computer is configured to perform MS/MS analysis which is data independent analysis, and
to create the scatter diagram based on information on the precursor ions obtained from the MS/MS spectra.

14. The non-transitory computer-readable recording medium storing a chromatograph mass spectrometry data processing program according to claim 11, wherein
the computer is configured to perform MS/MS analysis which is data independent analysis, and
to display a deconvolution spectrum calculated by calculation as an MS/MS spectrum.

15. The non-transitory computer-readable recording medium storing a chromatograph mass spectrometry data processing program according to claim 11, wherein
the computer is configured to create, based on the collected data, an extracted ion chromatogram corresponding to one of the precursor ions indicated on the scatter diagram, and
to display the extracted ion chromatogram on the same screen as the scatter diagram and the MS/MS spectra.

* * * * *